United States Patent
Yanagisawa

(10) Patent No.: US 10,084,674 B2
(45) Date of Patent: Sep. 25, 2018

(54) VIRTUAL DESKTOP OPERATION AND DATA CONTINUITY PRESERVATION

(71) Applicant: INTERNATIONAL BUSINESS MACHINES CORPORATION, Armonk, NY (US)

(72) Inventor: Takashi Yanagisawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 14/848,963

(22) Filed: Sep. 9, 2015

(65) Prior Publication Data
US 2017/0070406 A1   Mar. 9, 2017

(51) Int. Cl.
| | |
|---|---|
| *G06F 15/173* | (2006.01) |
| *H04L 12/26* | (2006.01) |
| *G06F 9/455* | (2018.01) |
| *G06F 9/451* | (2018.01) |

(52) U.S. Cl.
CPC .......... *H04L 43/08* (2013.01); *G06F 9/45558* (2013.01); *G06F 9/452* (2018.02); *G06F 2009/45562* (2013.01); *G06F 2009/45591* (2013.01)

(58) Field of Classification Search
CPC ..... H04L 43/08; H04L 12/26; G06F 9/45558; G06F 9/452; G06F 2009/45562; G06F 2009/45591; G06F 9/455
See application file for complete search history.

(56) References Cited

U.S. PATENT DOCUMENTS

| | | | |
|---|---|---|---|
| 8,719,522 B1 | 5/2014 | Chait et al. | |
| 2011/0004680 A1* | 1/2011 | Ryman | G06F 9/4445 709/224 |
| 2013/0073703 A1* | 3/2013 | Das | G06F 9/5072 709/223 |
| 2013/0275966 A1* | 10/2013 | Harper | G06F 11/1438 718/1 |
| 2015/0019704 A1* | 1/2015 | Suryanarayanan | H04L 43/08 709/224 |
| 2016/0055021 A1* | 2/2016 | Beveridge | G06F 9/45558 718/1 |
| 2016/0173619 A1* | 6/2016 | Singleton, IV | H04L 67/16 709/203 |

FOREIGN PATENT DOCUMENTS

JP       2013257638 A    12/2013

* cited by examiner

*Primary Examiner* — Cheikh Ndiaye
(74) *Attorney, Agent, or Firm* — Heslin Rothenberg Farley & Mesiti P.C.

(57) ABSTRACT

A method includes monitoring, by one or more processor, a communications connection to a client, and detecting a disconnection event. The disconnection occurs when activity over the communications connection drops below a threshold. Based on detecting the disconnection event, the one or more processor creates a cloned virtual environment by cloning an original virtual environment obtained by the client via the communications connection. The original virtual environment and the cloned virtual environment execute in parallel. The one or more processor obtains process information and based on the process information, applies at least one process to the cloned virtual environment and monitors the communications connection, to detect a reconnection event, where the reconnection event includes activity over the communications connection being above or equal to the threshold.

17 Claims, 6 Drawing Sheets

VIRTUAL DESKTOP OPERATION AND DATA CONTINUITY PRESERVATION

TECHNICAL FIELD

One or more aspects of the present invention relates to both operation continuity and data preservation in a computing environment with inconsistent connectivity, including mobile computing environments.

BACKGROUND

Many users of computer environments are mobile users and the mobility of the users and their devices can impact the consistency of their connection to a computer network. Many mobile devices utilize a virtual desktop environment through a connection to one or more computing resources accessible to the mobile device via a network connection. The virtual desktop, for example, can be hosted on a resource in a computing environment, such as a cloud. When there is an issue with the network connection between the mobile device and the resource providing the virtual environment, for example, a server that is part of a cloud, to preserve the state of the virtual desktop, the virtual desktop's functionality includes executing predetermined processes to automatically save the virtual desktop environment, enabling restoration of the system when the network connection is restored. While the virtual desktop environment at the time of the disconnection can be restored, operation continuity is sacrificed because not only does the execution of these processes interfere with the ability of the user to work on the desktop after the disconnection event, but any changes that user makes would be overwritten when the virtual desktop is restored to its pre-disconnection state when the connection is restored. Additionally, in an environment that is prone to intermittent connectivity loss, the constant execution of these process may impact the availability of the virtual desktop and the timing of the workflow of the user.

SUMMARY

Shortcomings of the prior art are overcome and additional advantages are provided through the provision of a method to preserve operation continuity and data consistency when network connections are broken in a computing environment. The method includes, for instance: monitoring, by one or more processor, a communications connection to a client, and detecting a disconnection event, wherein the disconnection event comprises activity over the communications connection dropping below a threshold; based on detecting the disconnection event, creating, by the one or more processor, a cloned virtual environment by cloning an original virtual environment obtained by the client via the communications connection, wherein based on the creating, the original virtual environment and the cloned virtual environment execute in parallel; obtaining, by the one or more processor, process information and based on the process information, applying at least one process to the cloned virtual environment; and monitoring, by the one or more processor, the communications connection, to detect a reconnection event, wherein the reconnection event comprises activity over the communications connection above or equal to the threshold.

Shortcomings of the prior art are overcome and additional advantages are provided through the provision of a computer program product to preserve operation continuity and data consistency when network connections are broken in a computing environment. The computer program product includes, for instance, a computer readable storage medium readable by a processing circuit and storing instructions for execution by the processing circuit for performing a method including: monitoring, by one or more processor, a communications connection to a client, and detecting a disconnection event, wherein the disconnection event comprises activity over the communications connection dropping below a threshold; based on detecting the disconnection event, creating, by the one or more processor, a cloned virtual environment by cloning an original virtual environment obtained by the client via the communications connection, wherein based on the creating, the original virtual environment and the cloned virtual environment execute in parallel; obtaining, by the one or more processor, process information and based on the process information, applying at least one process to the cloned virtual environment; and monitoring, by the one or more processor, the communications connection, to detect a reconnection event, wherein the reconnection event comprises activity over the communications connection above or equal to the threshold.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
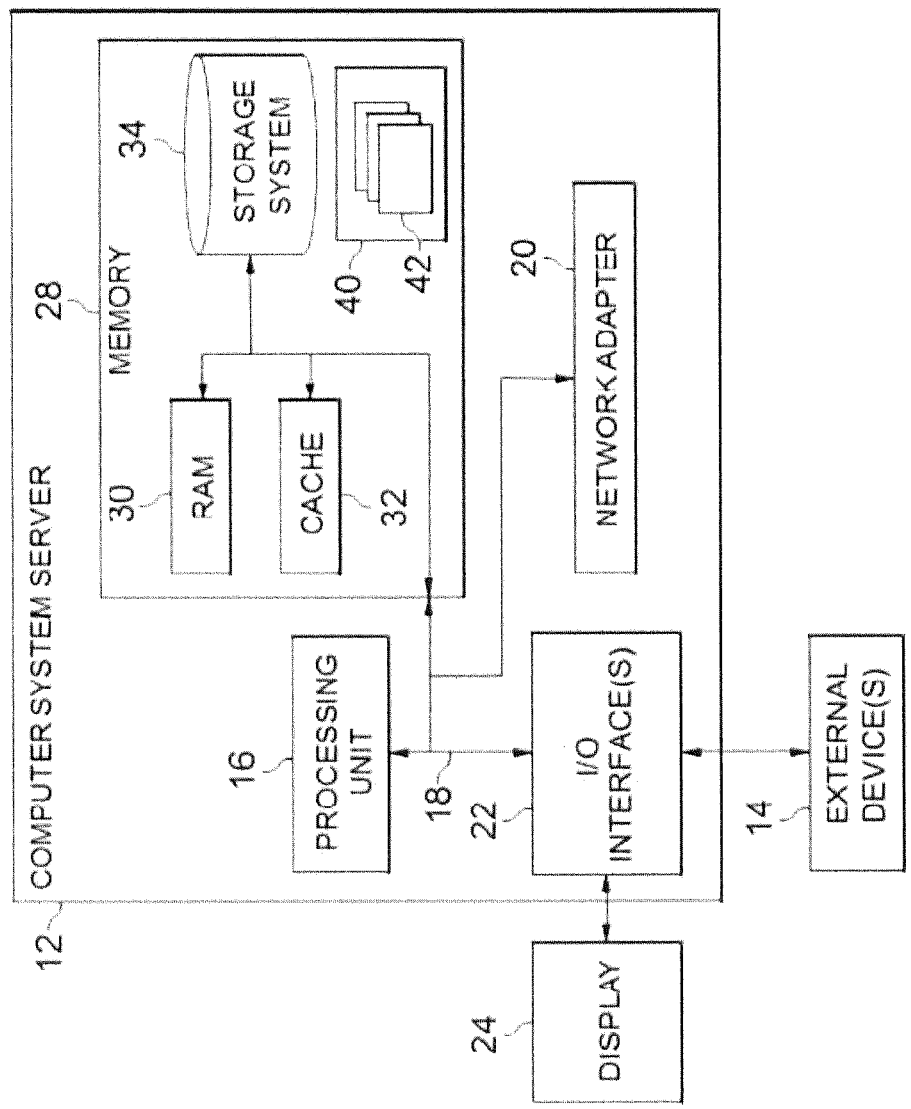
FIG. 1 depicts a cloud computing node, in accordance with one or more aspects set forth herein.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Embodiments of the present invention can provide both operation continuity and preserve data integrity (e.g., desktop integrity) by providing the user with the ability to continue working on a consistent virtual desktop during a disconnection from a network, but at the same time, executing any processes within the computing environment to retain the state of the virtual desktop. Embodiments of the present invention include methods, computer programs, and/or computer systems that preserve a virtual desktop environment during an unintended disconnection from a network and once the connection is restored, empower the user to select to continue working in a manner that preserves the environment itself, as it was, at the point of disconnection, or the environment at the point of reconnection, as the user, in an embodiment of the present invention, is able to continue working even during the disconnection.

Certain embodiments of the present invention represent a technological improvement over prior systems and methods for preserving a virtual desktop environment of a client. When the client is unintentionally disconnected from a network in an environment that is unstable and the timing of reconnection after disconnection is undetermined, the provider of the virtual desktop environment that the client accesses, such as a server, will execute certain predetermined processes, such as shutdown of a desktop and saving a file, in an effort to preserve the environment, however, these processes are disruptive to operation continuity. In an environment, such as a mobile environment, which is prone to constant disconnection and reconnection, the repetitive execution of these processes can disrupt the user's workflow. Certain embodiments of the present invention enable operation continuity, even during disconnection, for example, by allowing a user to select operation continuity or application of predetermined processes when accessing a virtual desktop environment in an unstable connection environment.

Aspects of various embodiments of the present invention provide a unique solution for preserving a virtual desktop environment in an unstable connection environment by providing a way for a user to continue working during and immediately after a disconnection state and without sacrificing the data integrity of the virtual environment overall. By cloning the virtual environment during a disconnection state, and applying any predetermined processes to the cloned virtual desktop, while separately preserving the original virtual desktop, an embodiment of the present invention preserves both operation continuity and data integrity.

In mobile environments that utilize virtual desktops, a current architecture is to provide software to the devices and a service, for example, utilizing a cloud computing environment. In embodiments of the present invention, the Software as a Service (SaaS) model enables individual clients to execute software by connecting to virtual desktops, while the application itself, including database elements, much of the program code that comprises the application, and many of the resources that execute the application, reside in the cloud. Utilization of the present invention may be especially relevant to the cloud computing architecture because the SaaS model relies upon connection to cloud resources by individual users, and when this connection is unstable, embodiments of the present invention enable the continuity of the operations of applications provided as SaaS.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computing resource, which may include, but is not limited to, a system/server 12, which is operational with numerous other general purpose or special purpose computing system environments or configurations. A computing resource in cloud computing node 10 may also include a personal computer and/or a mobile computing device. The term computer system/server 12 is merely used as an example. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
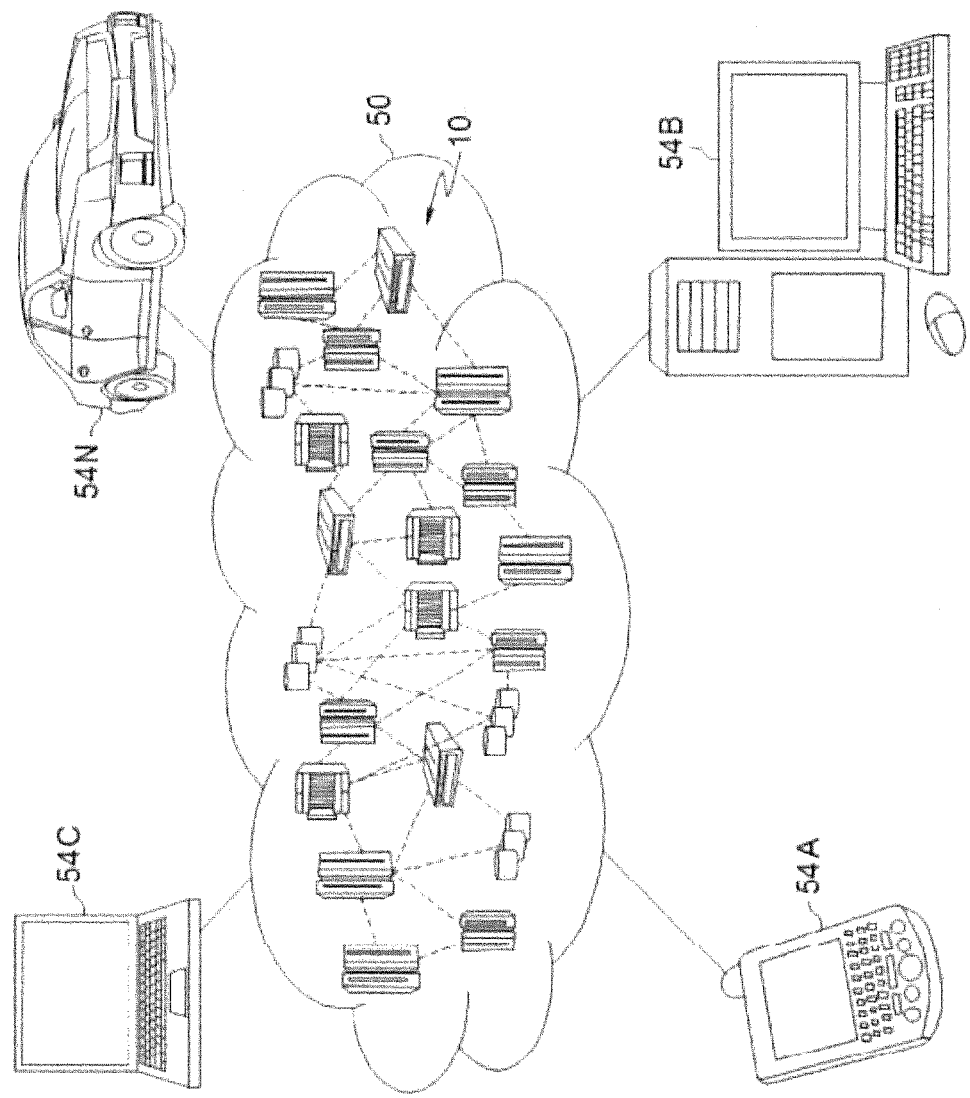
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
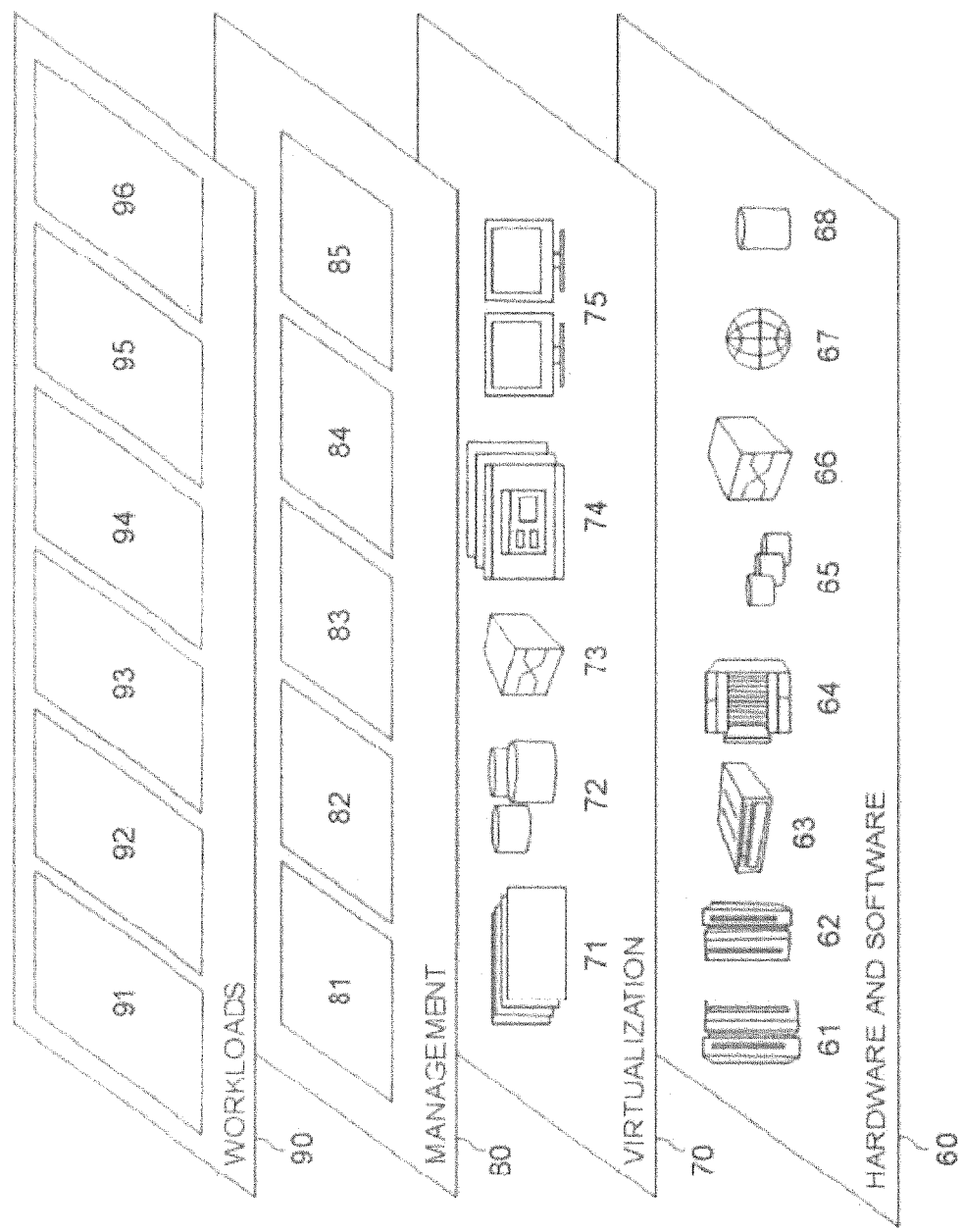
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing data and program elements to individual clients to generate the virtual desktop environment 96 described herein.

Figure 4:
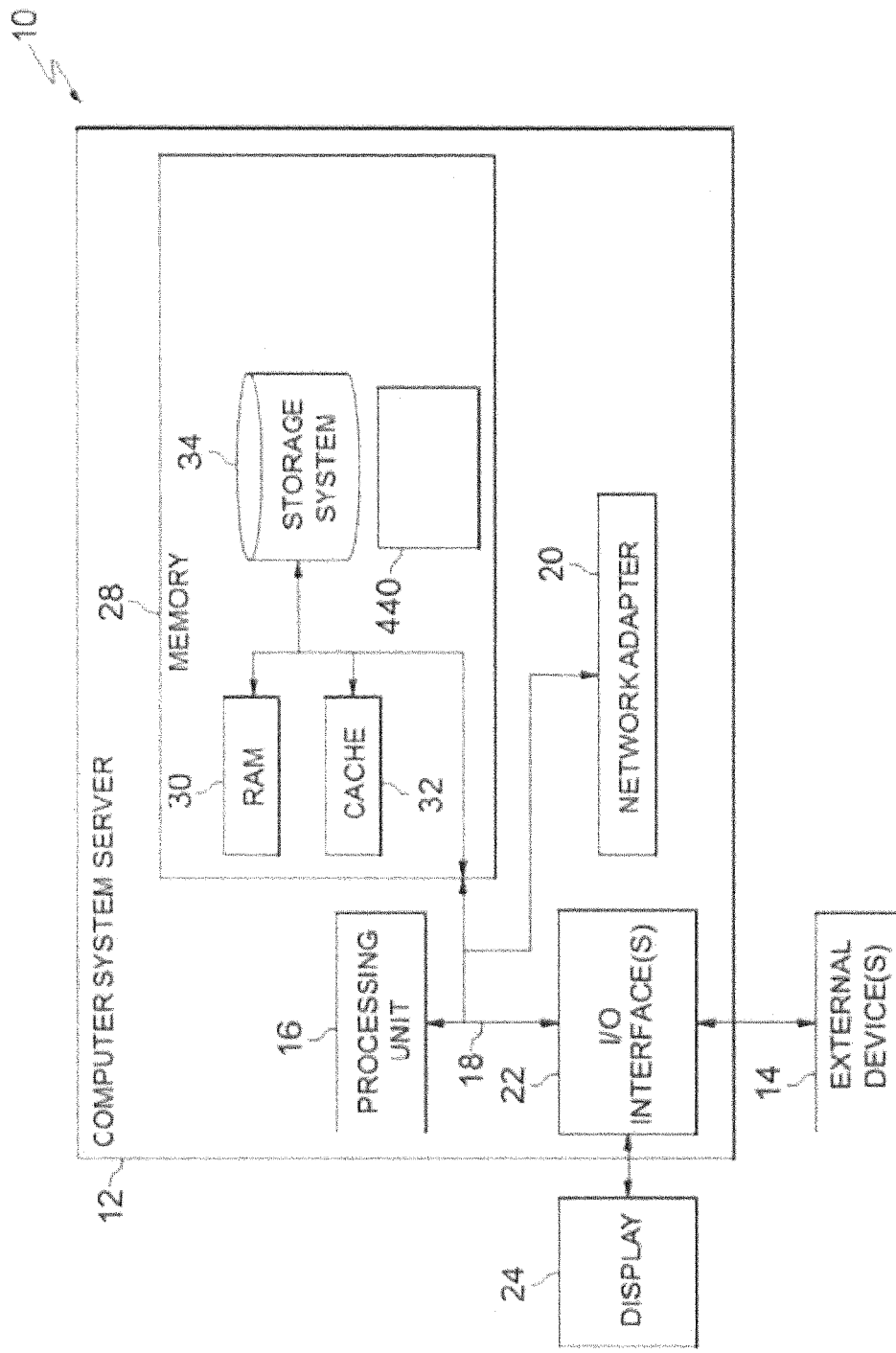
FIG. 4 depicts a hardware overview of a computing node, in accordance with one or more aspects set forth herein.

FIG. 4 depicts a hardware overview of a computing node 10, in accordance with one or more aspects set forth herein.

Program/utility 40 as set forth in FIG. 1 can include one or more program 440 as set forth in FIG. 4. For example, in an embodiment of the present invention, the program 440 can provide data and program elements to individual clients to generate the virtual desktop environment, as described in FIG. 3, and specifically, workloads layer 90.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
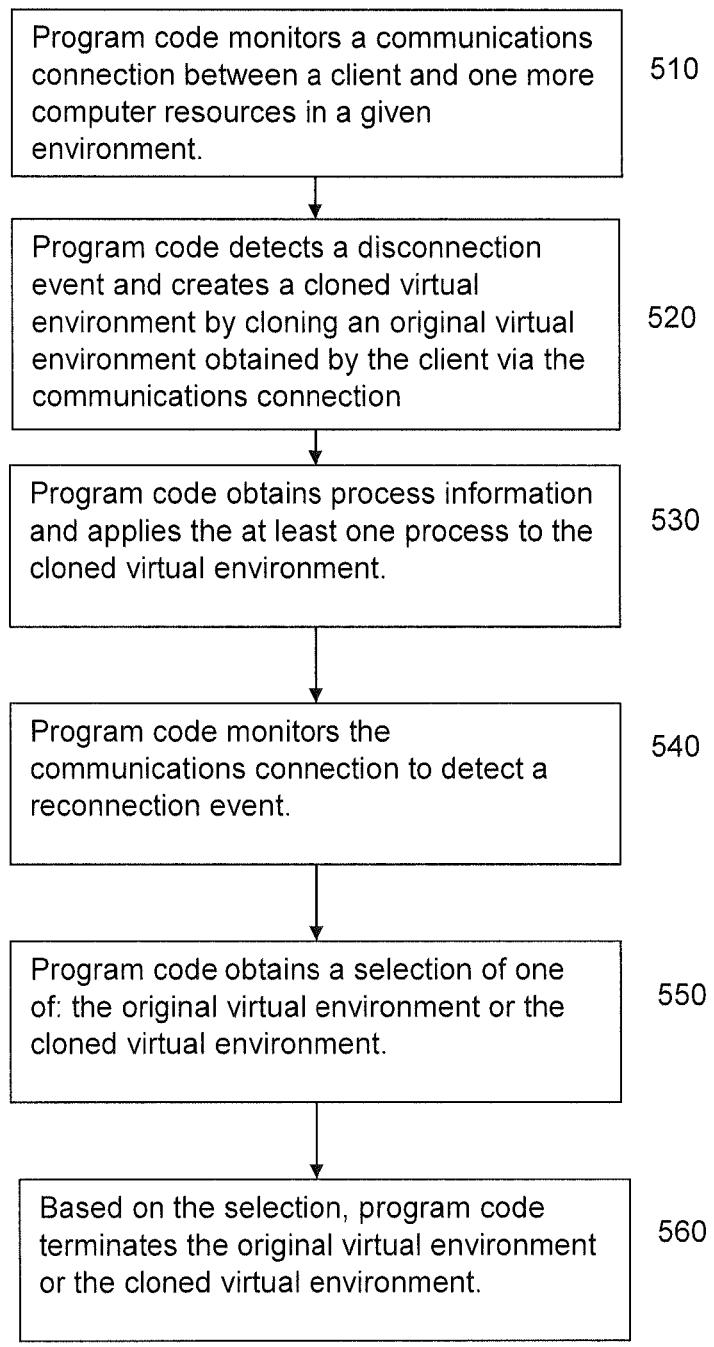
FIG. 5 depicts a workflow of an embodiment of the present invention.

FIG. 5 depicts a workflow of an embodiment of the present invention. One or more program 440 (as depicted in FIG. 4) monitors a communications connection between a client and one more computer resources in a given environment, including, but not limited to, a cloud computing node 10 (FIG. 1) (510). By monitoring this connection, the one or more program 440 can detect a disconnection event (520). In an embodiment of the present invention, a disconnection event occurs when the one or more program 440 determines that activity over the communications connection has dropped below a threshold (e.g., a predetermined threshold). In an embodiment of the present invention, the one or more program writes the disconnection event to a memory resource, including but not limited to, a user situation database.

The one or more program 440 may preconfigure the threshold and vary the type of threshold the one or more program 440 relies upon to determine that a disconnection event had taken place. For example, meeting the threshold may mean that there was no activity on the communications connection for a continuous time interval. However, the threshold itself can take different forms dependent on different elements, including the user and/or the elements in the computing environment itself. In certain embodiments of the present invention, elements that factor into setting the threshold for a disconnection event include, but are not limited to, the activity of the user of the client, the packets exchanged over the connection in a given time period, connection situation (network in use), and specifics of the connection environment. In an embodiment of the present invention, the one or more program 440 monitors the connection by pinging a computing resource, such as a cloud computing node 10, and/or a client, for a time period (e.g., a predetermined and/or defined time period). In an embodiment of the present invention, the one or more program 440 determines a disconnection event based on a continuous lack of activity over the connection for a time period.

In an embodiment of the present invention, one or more program 440 may monitor the communications connection to detect the disconnection event by monitoring a login of a user on a client, comparing activity of the user on the client to a threshold, and generating a notification when the activity is below the threshold.

Returning to FIG. 5, based on detecting the disconnection event, the one or more program 440 creates a cloned virtual environment by cloning an original virtual environment obtained by the client via the communications connection (520). In an embodiment of the present invention, the one or more program 440 creates the cloned environment so that it can run concurrently with the original virtual environment. In an embodiment of the present invention, the original virtual environment and the cloned virtual environment execute in parallel on a computing resource, for example, a server, which may be a cloud computing node 10. In an embodiment of the present invention, the one or more program 440 creates the cloned virtual environment based on memory in operation at the client. In an embodiment of the present invention, the cloning is operation situation copying.

The one or more program 440 obtains process information and based on the process information, applied at least one process (e.g., a predetermined process) to the cloned virtual environment (530). In an embodiment of the present invention, the one or more program 440 obtains the process information from a memory resource within the now closed, due to the disconnection, environment of the client. For example, the one or more program 440 may obtain the process information from a process saving database based on user activity on the client. In an embodiment of the present invention, the processes or processes can include shutting down the cloned virtual environment, disconnecting a specific application from the cloned virtual environment, saving data in operation in the cloned virtual environment, or executing a file (e.g., a batch or script file) in the cloned virtual environment.

The one or more program monitors the communications connection to detect a reconnection event (540). In an embodiment of the present invention, the one or more program 440 determines that the reconnection has occurred, i.e., the connection between the client and one or more computing element (e.g., a cloud computing node 10) has been restored. In an embodiment of the present invention the one or more program 440 determines that a reconnection event has occurred when the activity over the communications connection is above or equal to the threshold (e.g., a predetermined or defined threshold). The variety is the threshold for disconnection is applicable to the threshold for reconnection. For example, the one or more programs 440 may use a login user database as a database to determine whether a connection has been re-established.

At this point, both the cloned virtual environment and the original virtual environment are both executing on the resource generating the virtual desktops that the client accesses over the communications connection. While the original environment has enable the user to continue working (operation continuity), the one or more program 440 executed the processes on the cloned virtual environment to preserve the environment at the point of disconnection. Thus, in an embodiment of the present invention, after reconnection, the one or more program enables a user or process to select which environment to use moving forward.

Returning to FIG. 5, in an embodiment of the present invention, the one or more program obtains a selection of one of: the original virtual environment or the cloned virtual environment (550). Once a virtual environment has been selected, there is no need to devote resources to sustaining the non-selected environment. Thus, in an embodiment of the present invention, based on the selection, the one or more program 440 terminates the original virtual environment or the cloned virtual environment (560), i.e., the environment that the user or process did not select.

Figure 6:
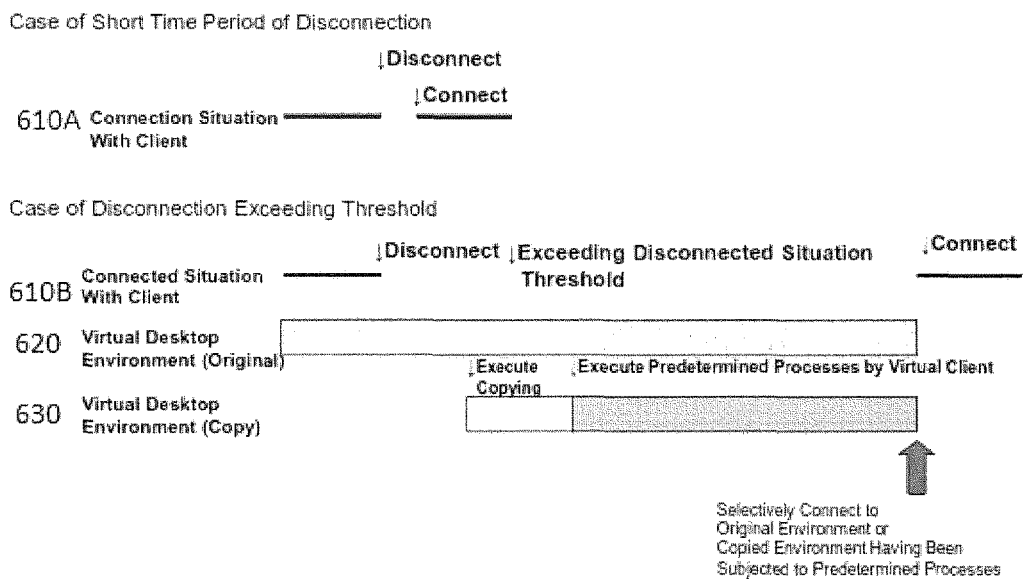
FIG. 6 depicts an operation flow of an embodiment of the present invention.

FIG. 6 visually depicts the different instances of a virtual desktop environment in an embodiment of the present invention and highlights how these instances create both operation continuity and data preservation (at the point of disconnection). Referring to FIG. 6, the Case of Short Time Period of Disconnection 602 is contrasted with Case of Disconnection Exceeding Threshold 605 to demonstrate the operation of an embodiment of the disclosed system. In both cases, Connection Situation with a Client 610A-B is inconsistent. When the one or more program 440 determines that the threshold has been exceeded, the one or more program 440 creates the Virtual Desktop Environment (Copy) 630. After the cloning, the one or more program 440 executes the processes, as seen referenced in FIG. 6 on the Virtual Desktop Environment (Copy) 630. Meanwhile, the Virtual Desktop Environment (Original) 620 remains active and the user can interact with this instance. Thus, when the Connection Situation with a Client 610B is restored, a user and/or process may selectively connect to the Virtual Desktop Environment (Original) 620, which was changed only by any user interaction during the disconnection, or the Virtual Desktop Environment (Copy) 630, which has been subject to the predetermined processes.

In an embodiment of the present invention, the one or more programs 440 may manage the methods of the present invention by utilizing certain database elements that may be on a resource local to the client and/or accessible to the client regardless of the state of the communications connection. Table 1 below describe certain database flags that the one or more programs 440 may set to assist in the implementation of the invention.

TABLE 1

| Item Name | Details |
| --- | --- |
| Long Time Disconnection Flag | Turn on, in the case of disconnection for a predetermined time period without log off process from user |
| | Turn off, in the case of reconnection process |
| Copy Environment Flag | Turn on, upon creation of a virtual desktop copied environment of the target user |
| | Turn off, upon deletion after execution of reconnection |
| Predetermined Process Execution Situation Flag | Turn on, upon creation of the copied environment of the virtual desktop environment |
| | Turn off, according to execution of predetermined processes |

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
monitoring, by one or more processors, a communications connection to a client, and detecting a disconnection event, wherein the disconnection event comprises activity over the communications connection dropping below a threshold;
based on detecting the disconnection event exceeding a predetermined time threshold, creating, by the one or more processors, a cloned virtual environment by cloning an original virtual environment obtained by the client via the communications connection;
executing, by the one or more processors, the original virtual environment and the cloned virtual environment in parallel, based on client activity over the communications connection after the disconnection event exceeding the predetermined time threshold;
obtaining, by the one or more processors, process information and based on the process information, applying at least one process to the cloned virtual environment to preserve a state of the original environment at the disconnection event; and
monitoring, by the one or more processors, the communications connection, to detect a reconnection event, wherein the reconnection event comprises activity over the communications connection above or equal to the threshold;
obtaining, by the one or more processors, a selection of one of: the original virtual environment or the cloned virtual environment; and
based on the selection, terminating, by the one or more processors, one of: the original virtual environment or the cloned virtual environment.

2. The method of claim 1, wherein the original virtual environment is consistent between creating the cloned virtual environment and terminating one of: the original virtual environment or the cloned virtual environment.

3. The method of claim 1, wherein the detecting further comprises saving the disconnection event in a memory.

4. The method of claim 1, wherein activity over the communications connection below a predetermined threshold comprises no activity on the communications connection for a continuous time interval.

5. The method of claim 1, wherein the monitoring the communications connection and detecting the disconnection event comprises:
monitoring, by the one or more processor, a login of a user on the client;
comparing, by the one or more processor, activity of the user on the client to a threshold; and
generating, by the one or more processor, a notification when the activity is below the threshold.

6. The method of claim 1, wherein the creating the cloned virtual environment is based on memory in operation at the client.

7. The method of claim 1, wherein the obtaining process information comprises obtaining an identifier of at least one predetermined process from a process saving database based on user activity on the client.

8. The method of claim 1, wherein the at least one process comprises at least one of: shutting down the cloned virtual environment, disconnecting a specific application from the cloned virtual environment, saving data in operation in the cloned virtual environment, or executing a file in the cloned virtual environment.

9. The method of claim 8, wherein the at least one process comprises executing a file and the file is one of: a batch file or a script file.

10. A computer program product comprising: a computer readable storage medium readable by one or more processor and storing instructions for execution by the one or more processor for performing a method comprising:
monitoring, by one or more processors, a communications connection to a client, and detecting a disconnection event, wherein the disconnection event comprises activity over the communications connection dropping below a threshold;
based on detecting the disconnection event exceeding a predetermined time threshold, creating, by the one or more processors, a cloned virtual environment by cloning an original virtual environment obtained by the client via the communications connection;
executing, by the one or more processors, the original virtual environment and the cloned virtual environment in parallel, based on client activity over the communications connection after the disconnection event exceeding the predetermined time threshold;
obtaining, by the one or more processors, process information and based on the process information, applying at least one process to the cloned virtual environment to preserve a state of the original environment at the disconnection event; and
monitoring, by the one or more processors, the communications connection, to detect a reconnection event, wherein the reconnection event comprises activity over the communications connection above or equal to the threshold;
obtaining, by the one or more processors, a selection of one of: the original virtual environment or the cloned virtual environment; and
based on the selection, terminating, by the one or more processors, one of: the original virtual environment or the cloned virtual environment.

11. The computer program product of claim 10, wherein the original virtual environment is consistent between creating the cloned virtual environment and terminating one of: the original virtual environment or the cloned virtual environment.

12. The computer program product of claim 10, wherein the detecting further comprises saving the disconnection event in a memory.

13. The computer program product of claim 10, wherein activity over the communications connection below a threshold comprises no activity on the communications connection for a predetermined continuous time interval.

14. The computer program product of claim 10, wherein the monitoring the communications connection and detecting the disconnection event comprises:
- monitoring, by the one or more processor, a login of a user on the client;
- comparing, by the one or more processor, activity of the user on the client to a threshold; and
- generating, by the one or more processor, a notification when the activity is below the threshold.

15. The computer program product of claim 10, wherein the creating the cloned virtual environment is based on memory in operation at the client and wherein the obtaining the process information comprises obtaining at least one predetermined process identifier from a process saving database based on user activity on the client.

16. The computer program product of claim 10, wherein the at least one process comprises at least one of: shutting down the cloned virtual environment, disconnecting a specific application from the cloned virtual environment, saving data in operation in the cloned virtual environment, executing a batch file in the cloned virtual environment, or executing a script file in the cloned virtual environment.

17. A system comprising:
- a memory;
- one or more processor in communication with the memory; and program instructions executable by the one or more processor via the memory to perform a method, the method comprising:
  - monitoring, by one or more processors, a communications connection to a client, and detecting a disconnection event, wherein the disconnection event comprises activity over the communications connection dropping below a threshold;
  - based on detecting the disconnection event exceeding a predetermined time threshold, creating, by the one or more processors, a cloned virtual environment by cloning an original virtual environment obtained by the client via the communications connection;
  - executing, by the one or more processors, the original virtual environment and the cloned virtual environment in parallel, based on client activity over the communications connection after the disconnection event exceeding the predetermined time threshold;
  - obtaining, by the one or more processors, process information and based on the process information, applying at least one process to the cloned virtual environment to preserve a state of the original environment at the disconnection event; and
  - monitoring, by the one or more processors, the communications connection, to detect a reconnection event, wherein the reconnection event comprises activity over the communications connection above or equal to the threshold;
  - obtaining, by the one or more processors, a selection of one of: the original virtual environment or the cloned virtual environment; and
  - based on the selection, terminating, by the one or more processors, one of: the original virtual environment or the cloned virtual environment.

* * * * *